US011605106B2

(12) United States Patent
Bloy et al.

(10) Patent No.: US 11,605,106 B2
(45) Date of Patent: Mar. 14, 2023

(54) AUTOMATED SOLUTION FOR LOYALTY REWARDS POINTS

(71) Applicant: The Toronto-Dominion Bank, Toronto (CA)

(72) Inventors: Adrian Bloy, Ottawa (CA); Danielle Marie Mullenax, Gatineau (CA); Dominic Elia, Etobicoke (CA); Michael James Taggart, Ottawa (CA); Lance Lucas Leisher, Ottawa (CA); Arlene Lori Maciver, Ottawa (CA); Christiane Jewer, Ottawa (CA); Ameya Warty, Toronto (CA); Javon Tavoy Findlator, Toronto (CA); Sean Michael Mullen, Russell (CA); Stacey-Anne Callender, Toronto (CA); Jeffery Macdonald, Ottawa (CA); Sheirline Hanna, Ottawa (CA)

(73) Assignee: The Toronto-Dominion Bank

(*) Notice: Subject to any disclaimer, the term of this patent is extended or adjusted under 35 U.S.C. 154(b) by 98 days.

(21) Appl. No.: 16/156,858

(22) Filed: Oct. 10, 2018

(65) Prior Publication Data

US 2020/0118156 A1    Apr. 16, 2020

(51) Int. Cl.
G06Q 30/00 (2012.01)
G06Q 30/0226 (2023.01)
G06Q 30/0207 (2023.01)

(52) U.S. Cl.
CPC ..... *G06Q 30/0233* (2013.01); *G06Q 30/0215* (2013.01)

(58) Field of Classification Search
CPC . G06Q 30/02; G06Q 30/0233; G06Q 30/0215

(Continued)

(56) References Cited

U.S. PATENT DOCUMENTS

2002/0161630 A1* 10/2002 Kern .................. G06Q 30/0215
                                                              705/14.32
2007/0129955 A1*  6/2007 Dalmia ................ G06Q 20/40
                                                               705/1.1

(Continued)

OTHER PUBLICATIONS

A. L. Nsakanda, M. Diaby and Y. Cao, "A Predictive Model of Redemption and Liability in Loyalty Reward Programs Industry," 2010 43rd Hawaii International Conference on System Sciences, 2010, pp. 1-11, doi: 10.1109/HICSS.2010.27. (Year: 2010).*

(Continued)

*Primary Examiner* — Sun M Li
(74) *Attorney, Agent, or Firm* — Fish & Richardson P.C.

(57) ABSTRACT

The present disclosure involves systems, software, and computer implemented methods for automatically providing a lending offer for loyalty points based on a customer account analysis. One example method includes initiating an offer analysis for a customer account associated with a particular customer and storing an account balance and a point deficit balance. The offer analysis determines whether to provide an offer for a point loan, and is based on profile information of the customer, a current point balance, and a reward identified from the loyalty account. If an offer is to be provided, an offer for a loan of points equal to the difference between the current point balance of a loyalty account and the point value cost of the reward is transmitted to a client device of the customer. If accepted, the current point balance and the point deficit are both incremented by the amount of the offer.

19 Claims, 4 Drawing Sheets

(58) Field of Classification Search
USPC ............ 705/14.17, 14.18, 14.25, 14.3, 14.33
See application file for complete search history.

(56) References Cited

U.S. PATENT DOCUMENTS

| | | | | |
|---|---|---|---|---|
| 2008/0208689 | A1* | 8/2008 | Johnson ................. | G06Q 20/04 |
| | | | | 705/14.27 |
| 2010/0106576 | A1* | 4/2010 | Etheredge .............. | G06Q 30/02 |
| | | | | 705/14.13 |
| 2018/0300805 | A1* | 10/2018 | Elliott .................... | G06Q 30/02 |

OTHER PUBLICATIONS

A. Labbi and C. Berrospi, "Optimizing marketing planning and budgeting using Markov decision processes: An airline case study," in IBM Journal of Research and Development, vol. 51, No. 3.4, pp. 421-431, May 2007, doi: 10.1147/rd.513.0421. (Year: 2007).*

* cited by examiner

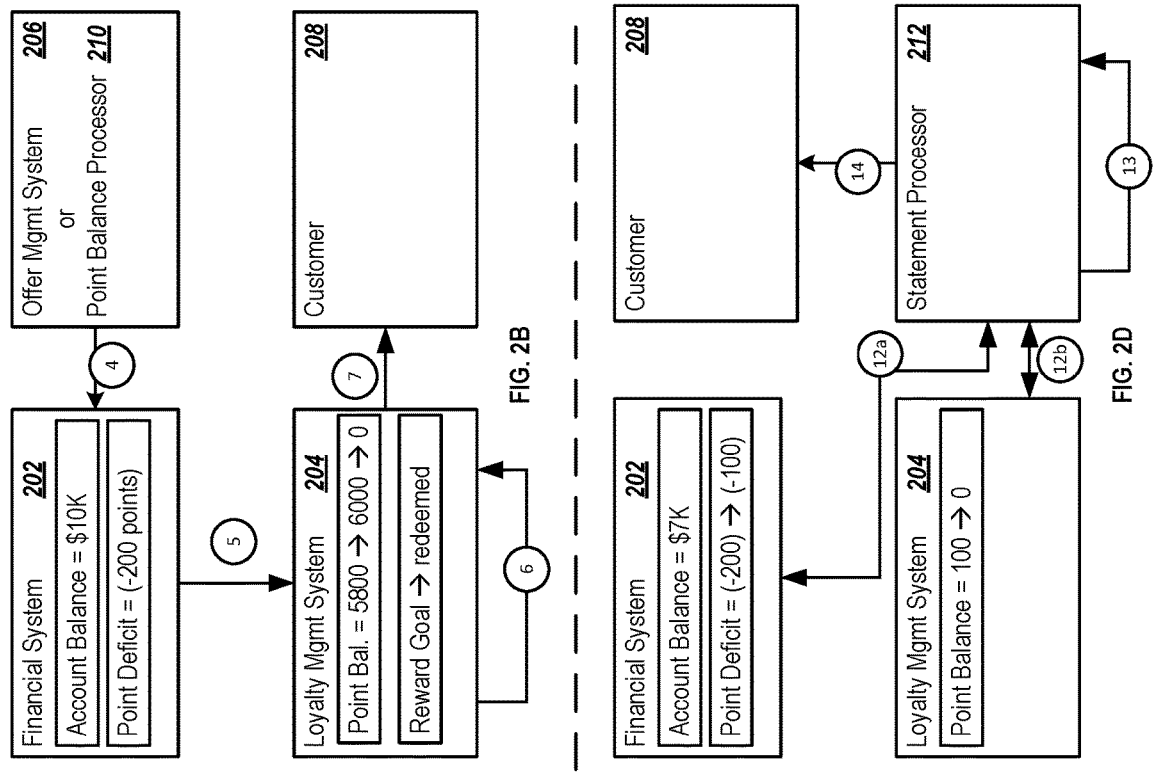
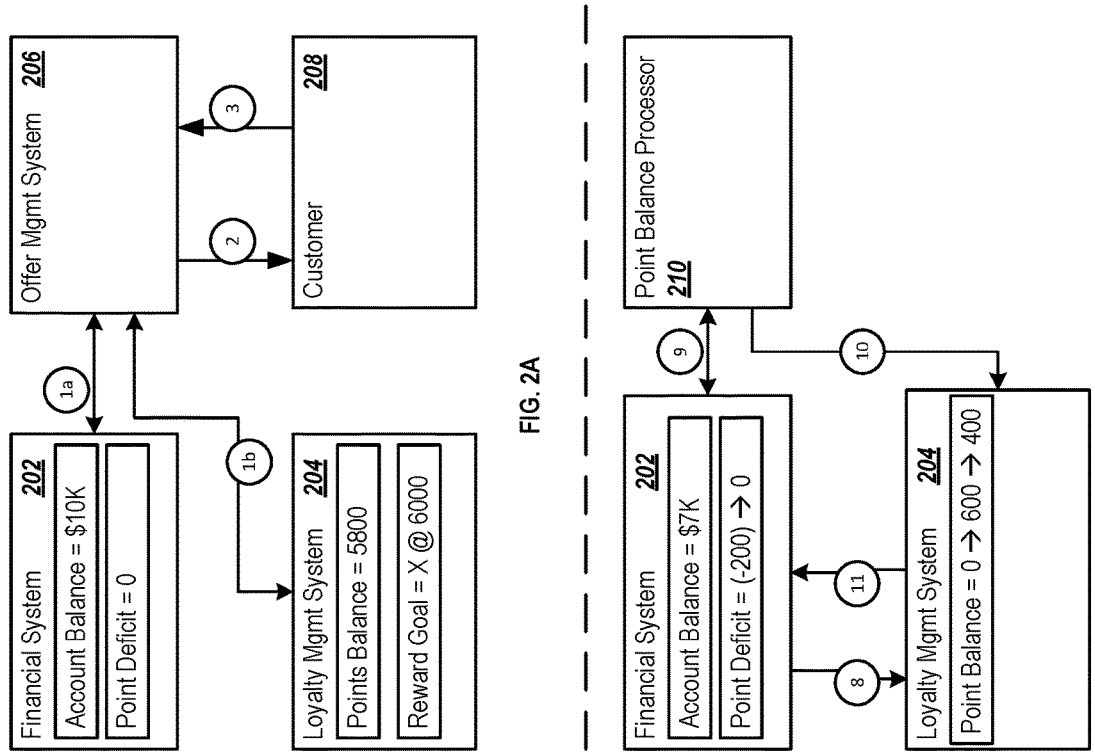
FIG. 2A
FIG. 2B
FIG. 2C
FIG. 2D

AUTOMATED SOLUTION FOR LOYALTY REWARDS POINTS

TECHNICAL FIELD

The present disclosure relates to computer-implemented methods, software, and systems for automatically identifying, providing, and implementing an offer for providing loyalty points to users based on an account analysis and one or more predefined goals.

BACKGROUND

Today's financial account customers represent significant customer segments for financial and lending institutions. In an effort to encourage significant usage of their financial products, many financial institutions and payment card providers may offer various loyalty point systems to reward customers for loyalty to and usage of their payment instruments. Various rewards require certain loyalty point thresholds in order to redeem those rewards. In some instances, additional points may be bought by the customer in order to reach those particular thresholds and redeem or take advantage of the particular reward. In many instances, the relative generosity of points issued for customer actions and the ability to redeem points with ease may be a significant selling point for customers.

SUMMARY

The present disclosure involves systems, software, and computer-implemented methods for automatically identifying, providing, and implementing a lending offer for providing loyalty points to users based on an account analysis and one or more predefined goals. A first example system includes a communications module, at least one memory storing instructions, a repository storing a plurality of customer accounts, a repository storing a catalog of rewards associated with a loyalty program, and a repository storing a plurality of loyalty accounts associated with the loyalty program, and at least one hardware processor interoperably coupled with the at least one memory and the communications module, wherein the instructions instruct the at least one hardware processor. Each customer account in the plurality of customer accounts is associated with a particular customer, and stores an account balance and a point deficit balance. Each reward in the catalog of rewards corresponds to a point value cost. Each loyalty account corresponds to at least one customer account of the plurality of customer accounts, and is associated with a current point balance and at least one reward identified as a potential reward goal for the customer of the corresponding customer account. The instructions can cause to hardware processor to perform the following operations, including identifying a triggering event initiating a point balance loan offer analysis for a first customer account, wherein the point balance loan offer analysis determines whether to offer the customer associated with the first customer account a loan of points for a loyalty program. The first customer account of the customer can be accessed to identify profile information stored in the first customer account, and the loyalty account corresponding to the first customer account can be accessed to identify a current point balance of the loyalty account and the at least one reward identified as the potential reward goal for the customer. The point balance loan offer analysis can be applied to the first customer account based on identified profile information and the identified current point balance and at least one identified reward. In response to determining that a point balance loan offer is to be provided to the customer associated with the first customer account, an offer for a point balance loan equal to an amount of at least a difference between the current point balance of the loyalty account and the point value cost of the reward corresponding to the at least one identified reward from the loyalty account can be transmitted, via the communications module, to a client device associated with the customer. In response to receiving, via the communications module and from the client device, an acceptance of the offer from the customer for the point balance loan, the current point balance of the loyalty account associated with the first customer account can be increment by the amount of the offer, and the point deficit balance of the first customer account can be incremented by the amount of the offer.

Implementations can optionally include one or more of the following features.

In some instances, the triggering event initiating the point balance loan offer analysis for the first customer account can include a periodic account review of each of the plurality of customer accounts.

In some instances, after incrementing the current point balance of the loyalty account associated with the first customer account by the amount of the offer, a redemption of the at least one identified reward in the loyalty account can be performed using the point value of the at least one identified reward from the incremented point balance of the loyalty account. The point balance of the loyalty account is decremented by the point value of the at least one identified reward. In some of those instances, the plurality of customer accounts are associated with an account period, and, at an end of a close of the account period, the instructions instruct the at least one hardware processor to, automatically and without user input, for each of the plurality of customer accounts, identify an amount of loyalty points earned during the current account period for a particular customer account, increment the current point balance of the loyalty account by the identified amount of loyalty points earned, and, in response to determining that the point deficit balance of the first customer account is not zero, decrement the current point balance of the loyalty account to reduce the value of the point deficit balance of the first customer account. In some of those instances, decrementing the current point balance of the loyalty account to reduce the value of the point deficit balance of the first customer account, when the point deficit balance of the first customer account is greater than the incremented current point balance of the loyalty account, comprises reducing the point deficit balance of the first customer account by the incremented current point balance of the loyalty account and reducing the incremented current point balance of the loyalty account to zero. In some of those instances, the instructions instruct the at least one hardware processor to, for each of the plurality of customer accounts, perform a statement generation process, wherein the statement generation process comprises obtaining information from each customer account identifying at least a current account balance of the corresponding customer account and whether the point deficit balance is non-zero, obtaining information from each loyalty account associated with a corresponding customer account identifying a current point balance, and generating a statement for the corresponding customer account including the current account balance of the corresponding customer account and the identified current point balance of the loyalty account. In response to identifying that the point deficit balance is non-zero for a particular customer, the statement generation process is interrupted to insert the value of the point deficit balance into the generated statement, and the generated statement is transmitted to the client device associated with the corresponding customer account. In some of those instances, the statement generation process comprises a batch process performed for each of the customer accounts at the end or close of the account period.

In some instances, decrementing the current point balance of the loyalty account to reduce the value of the point deficit balance of the first customer account, when the point deficit balance of the first customer account is less than the incremented current point balance of the loyalty account, comprises reducing the incremented current point balance by the point deficit balance to a new current point balance and reducing the point deficit balance of the first customer account to zero.

In some instances, determining that the point balance loan offer is to be provided to the customer associated with the first customer account comprises determining whether a difference between the point value cost of the reward associated with the identified reward is within a threshold range above the current point balance of the loyalty account, and, in response to determining that the difference is within the threshold range, determining that the point balance loan offer is to be provided to the customer associated with the first customer account.

In some instances, determining that the point balance loan offer is to be provided to the customer associated with the first customer account further comprises determining, from an analysis of transactions associated with the first customer account, whether the difference between the point value cost of the reward associated with the identified reward and the current point balance of the loyalty account has already been earned by the first customer account but has not been allocated during a current account period, and, in response to determining that the difference has already been earned by the first customer account, determining that the point balance loan offer is to be provided to the customer associated with the first customer account.

Similar operations and processes may be performed in a different system comprising at least one processor and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. Additionally, similar operations can be associated with or provided as computer-implemented software embodied on tangible, non-transitory media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIGS. 2A-D represent a set of situational diagrams illustrating an example identification, offer, and implementation of a lending offer for providing loyalty points to users based on an account analysis and one or more predefined goals.

DETAILED DESCRIPTION

Figure 1:
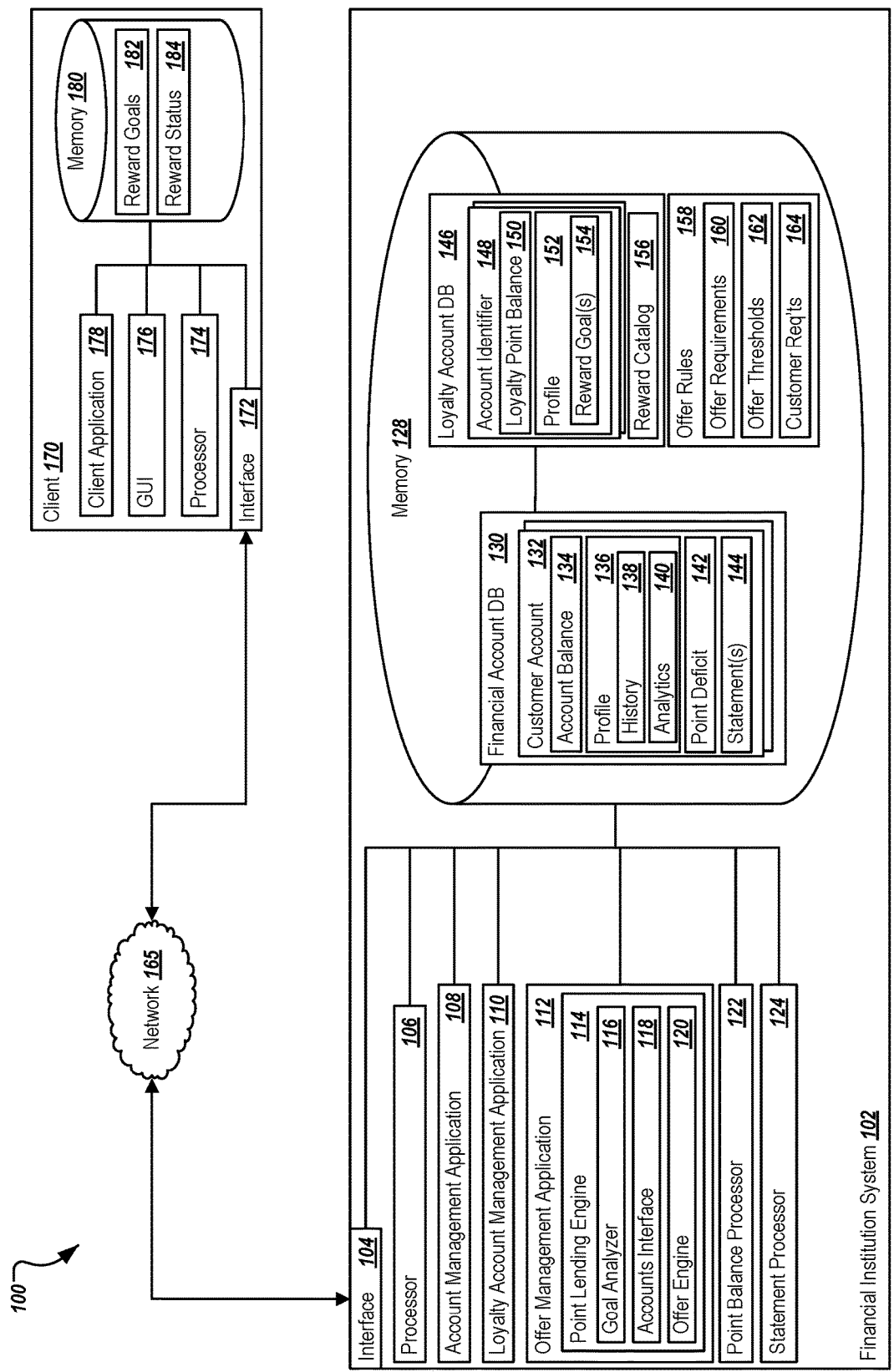
FIG. 1 is a block diagram illustrating an example system for automatically identifying, providing, and implementing a lending offer for providing loyalty points to users based on an account analysis and one or more predefined goals.

The present disclosure describes various tools and techniques associated with automatically identifying, providing, and implementing a lending offer for providing loyalty points to users based on an account analysis and one or more predefined goals. Users or customers (referred to herein as "users") may be associated with one or more loyalty accounts that can be associated with a financial account, such as a credit or debit account and corresponding payment card, a checking account, or other suitable accounts. Through ongoing transactions using those accounts, users can accumulate loyalty points that can later be redeemed for rewards, such as free or discounted travel (e.g., flights, hotels), goods (e.g., magazines or other products), or services. Some loyalty programs may also allow bonus points to be earned through affiliate interactions and transactions, such as purchasing certain products or through certain vendors. As users accumulate points, certain rewards may be redeemed, although larger awards may take significant time and effort to reach for redemption.

In the present solution, users can identify particular rewards for which they are interested or are working towards. In some instances, the identification may be made specifically for a reward (e.g., a particular trip associated with a predefined point value for redemption), while in others, the particular reward may be automatically identified or determined based on prior user actions or interactions (e.g., identifying potential travel to be taken based on prior user travel, a reward for a free flight or hotel night may be identified). Using an offer management system, a determination can be made, upon reviewing the identified reward and its associated point value, whether the user should be eligible for an offer to borrow future points now for the identified reward. The determination can be based on a number of considerations.

First, a number of points still needed to reach the reward level may be determined. The number of points may be considered as a relative amount towards the overall number of points needed (e.g., only 10% of points required are needed), or an absolute number of additional points (e.g., 1000 points are required to reach the goal). For example, if the user has 90% of the points needed for a trip, it may be more likely that an offer is to be made. However, if that point amount is a relatively significant amount, the offer may not be made. The specific offer requirements can be provided in a predefined and/or dynamic set of rules used to evaluate how to proceed.

In addition to the points required, a user-specific analysis can be performed to determine, at least in part, whether the offer should be generated. For example, a user's transaction history can be used to determine a likely or expected amount of points that are to be awarded to the user during a particular period of time. In some instances, points may be assigned after each billing cycle, for example, based on the amount spent and any particular additional point-earning actions or transactions. In some instances, a current billing cycle or period may be considered by the offer management system as well to determine whether the user has already earned at least a part of the portion needed in recent, but not yet billed, transactions or interactions. Using the user's transaction and/or point-earning history as a basis, a determination can be made as to how many billing cycles or point-assigning periods that would be needed before the user can repay any borrowed points from an offer. If a user typically earns 7000 points per billing cycle (e.g., per month), then an offer of 1000 points to reach a particular reward may be acceptable based on the rules. However, if a user is new, and has little transaction history, providing a large offer of points may not be acceptable. In those instances, if an offer is provided, the user may accept the offer, redeem the reward, and then abandon use of card or account associated with the rewards, leaving the amount borrowed outstanding and any benefits provided by the offer remaining unpaid for.

In addition to identifying and offering future points, the present solution can also provide tools and mechanisms for managing financial statement generation after the point borrowing mechanism is introduced. In particular, some financial account management systems may not be equipped to manage and monitor point deficits occurring after an offer to borrow points is accepted. In those instances, a new field may be added to or associated with the financial account of the user. In some instances, that new field may be a custom-defined data field used to manage and/or identify any deficits in points occurring after the borrowing process. The field may be associated with each user account, or may only be defined for particular users who obtain or otherwise incur a deficit in points due to an accepted borrowing offer. In normal instances, a statement generation process can access an account management system and a loyalty account management system to obtain information about a current account balance and a loyalty point balance, respectively. In a revised system based on the current solution, the statement generation process, which may be executed by the financial institution, one of its systems, or a third-party system, as a batch process, can be interrupted to perform a determination whether a deficit exists for a particular user account prior to generating that account's statement. If a deficit does exist, then the information associated with the deficit can be inserted into the corresponding statement for the user. The account balance information and the loyalty point balance information can then be obtained as normal, and an updated statement can be generated and provided to the user reflecting any point deficit or debt.

Further, a point assignment or allocation process may run or execute at certain times, such as after the close of a billing cycle or period. When points are earned by the user, such as in response to a calculated spending amount (e.g., 1 point for each dollar spent), that amount can be transferred to a loyalty account associated with the user. If a deficit exists, some or all of the newly earned and assigned points can be used against the deficit. If the entirety of the deficit can be covered by the earned points, the deficit can be zeroed out. If the entirety cannot be fully covered by the newly earned points, then all of the earned points can be reduced from the loyalty account and the deficit can be reduced by that point amount. In some instances, the statement generation process can be performed after the point assignment or allocation process, such that an updated deficit can be provided to the user.

Turning to the illustrated example implementation, FIG. 1 is a block diagram illustrating an example system 100 for automatically identifying, providing, and implementing a lending offer for providing loyalty points to users based on an account analysis and one or more predefined goals. In general, the system 100 allows the illustrated components to share and communicate information across devices and systems (e.g., financial institution system 102 and client 170, among others, via network 165). As described herein, the financial institution system 102 may be a cloud-based component or system (partially or fully), while in other instances, non-cloud systems may be used. In some instances, non-cloud-based systems, such as on-premise systems, client-server applications, and applications running on one or more client devices, as well as combinations thereof, may use or adapt the processes described herein. Although components are shown individually, in some implementations, functionality of two or more components, systems, or servers may be provided by a single component, system, or server.

As used in the present disclosure, the term "computer" is intended to encompass any suitable processing device. For example, financial institution system 102 and client 170 may be any computer or processing device such as, for example, a blade server, general-purpose personal computer (PC), Mac®, workstation, UNIX-based workstation, or any other suitable device. Moreover, although FIG. 1 illustrates a single financial institution system 102, the system 102 can be implemented using a single system or more than those illustrated, as well as computers other than servers, including a server pool. In other words, the present disclosure contemplates computers other than general-purpose computers, as well as computers without conventional operating systems. Similarly, the client 170 may be any system that can request data and/or interact with the financial institution system 102. The client 170, also referred to as client device 170, in some instances, may be a desktop system, a client terminal, or any other suitable device, including a mobile device, such as a smartphone, tablet, smartwatch, or any other mobile computing device. In general, each illustrated component may be adapted to execute any suitable operating system, including Linux, UNIX, Windows, Mac OS®, Java™ Android™, Windows Phone OS, or iOS™, among others. The client 170 may include one or more specific applications executing on the client 170, or the client 170 may include one or more Web browsers or web applications that can interact with particular applications executing remotely from the client 170, such as the account management application 108, loyalty account management application 110, and the offer management application 112, among others.

The financial institution system 102 may be associated with the one or more applications or platforms, and may be associated with or a part of a cloud platform or system. As illustrated, the financial institution system 102 includes or is associated with interface 104, processor(s) 106, the account management application 108, the loyalty account management application 110, offer management application 112, a point balance processor 122, a statement processor 124, and memory 128. While illustrated as provided by or included in the financial institution system 102, parts of the illustrated contents may be separate or remote from the financial institution system 102. For example, while illustrated as a single system, the account management application 108 may be managed at a first system and/or application infrastructure, while the loyalty account management application 110 may be managed at a second system and/or application infrastructure. Similarly, the offer management application 112 may be managed at a third system and/or application infrastructure. In some instances, the underlying financial institution may run the account management application 108 itself, while relying on one or more third-parties to manage and provide functionality for loyalty accounts and offer management, as well as other operations such as statement processing. In those instances, the various applications may be able to communicate and interact with each other through internal and/or external communications, including via one or more channels and protocols, including through one or more dedicated application programming interfaces (APIs) and/or interfaces through which information needed to execute is available. For purposes of the present illustration, these portions are illustrated together for ease of description.

Returning to the financial institution system 102 illustrated in FIG. 1, the interface 104 is used by the financial institution system 102 for communicating with other systems in a distributed environment—including within the environment 100—connected to the network 165, e.g., client 170, and other systems communicably coupled to the illustrated financial institution system 102 and/or network 165. Generally, the interface 104 comprises logic encoded in software and/or hardware in a suitable combination and operable to communicate with the network 165 and other components. More specifically, the interface 104 may comprise software supporting one or more communication protocols associated with communications such that the network 165 and/or interface's hardware is operable to communicate physical signals within and outside of the illustrated environment 100. Still further, the interface 104 may allow the financial institution system 102 to communicate with the client 170 and/or other portions illustrated within the financial institution system 102 to perform the operations described herein.

Network 165 facilitates wireless or wireline communications between the components of the environment 100 (e.g., between the financial institution system 102, the client(s) 170, etc.), as well as with any other local or remote computers, such as additional mobile devices, clients, servers, or other devices communicably coupled to network 165, including those not illustrated in FIG. 1. In the illustrated environment, the network 165 is depicted as a single network, but may be comprised of more than one network without departing from the scope of this disclosure, so long as at least a portion of the network 165 may facilitate communications between senders and recipients. In some instances, one or more of the illustrated components (e.g., the offer management application 112, the statement processor 124, etc.) may be included within or deployed to network 165 or a portion thereof as one or more cloud-based services or operations. The network 165 may be all or a portion of an enterprise or secured network, while in another instance, at least a portion of the network 165 may represent a connection to the Internet. In some instances, a portion of the network 165 may be a virtual private network (VPN). Further, all or a portion of the network 165 can comprise either a wireline or wireless link. Example wireless links may include 802.11a/b/g/n/ac, 802.20, WiMax, LTE, and/or any other appropriate wireless link. In other words, the network 165 encompasses any internal or external network, networks, sub-network, or combination thereof operable to facilitate communications between various computing components inside and outside the illustrated environment 100. The network 165 may communicate, for example, Internet Protocol (IP) packets, Frame Relay frames, Asynchronous Transfer Mode (ATM) cells, voice, video, data, and other suitable information between network addresses. The network 165 may also include one or more local area networks (LANs), radio access networks (RANs), metropolitan area networks (MANs), wide area networks (WANs), all or a portion of the Internet, and/or any other communication system or systems at one or more locations.

The financial institution system 102 also includes one or more processors 106. Although illustrated as a single processor 106 in FIG. 1, multiple processors may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the financial institution system 102. Specifically, the processor 106 executes the algorithms and operations described in the illustrated figures, as well as the various software modules and functionality, including the functionality for sending communications to and receiving transmissions from clients 170, as well as to other devices and systems. Each processor 106 may have a single or multiple core, with each core available to host and execute an individual processing thread. Further, the number of, types of, and particular processors 106 used to execute the operations described herein may be dynamically determined based on a number of requests, interactions, and operations associated with the financial institution system 102.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

The financial institution system 102 can include, among other components, several applications, entities, programs, agents, or other software or similar components capable of performing the operations described herein. As illustrated, the financial institution system 102 includes or is associated with the account management application 108, the loyalty account management application 110, the offer management application 112, the point balance processor 122, and the statement processor 124.

The account management application 108 may be any application, program, other component, or combination thereof that is associated with a financial institution and used to manage and store user account-related information and metrics. The account management application 108 may access or receive information from one or more transactional systems, or may be a part of those transactional systems, where information relating to various user accounts is collected and information can be stored and/or referenced. In some instances, the account management application 108 may be a part of system executing, for example, a TSYS backend suite of applications managing one or more credit or other payment cards. The account management application 108 may, in some instances, store information relating to one or more payment card accounts, or accounts associated with one or more payment cards, as well as financial accounts associated with one or more loyalty and/or reward programs.

The account management application 108 may in some instances, be associated with or manage a financial account database 130 or set of information, where the financial account database 130 can store information associated with one or more customer accounts 132. Each customer account 132 may be associated with a particular customer and/or specific customer account. Where customers are associated with multiple accounts, each account 132 may be linked to other related accounts, or may be separate. Each account 132 may be related to a payment card, a financial account (e.g., a checking account), or both. Each customer account 132 may include an account balance 134, a profile 136, a point deficit 142 (if one exists), and one or more generated statements 144 for the account 132, although generated statements 144 may be stored separately in some instances. The account balance 134 can store information associated with a current account balance in a checking or savings account, a current balance associated with a credit card account, or any other information identifying a current balance of the corresponding account 132. The customer profile 136 can include any suitable information associated with the associated customer. In some instances, demographic information may be stored in the account profile 136. As illustrated, an account history 138 may be included in the profile 136, and can be used to provide historical information related to account usage by the customer, such as historical spending or payment information, as well as timeliness information related to payments associated with the account 132 and/or other associated accounts 132. Further, a set of customer analytics 140 may also be included in or derived from the account 132 and historical information therein. For example, the analytics 140 may identify an average spending or payment amount on the account 132. For example, if a user spends, on average, $5000 per month on the account 132, that information may be included in the analytics 140. Other analytics may be used by the offer management application 112 when determining whether particular offers are to be issued to the customer as described herein. The point deficit 142 can be updated, for example, by the point balance processor 122 described below, and used to generate a modified statement 144 by the statement processor 124. The point deficit 142 may be a field generated from one or more user-definable custom fields offered by the account management application 108 in the financial account database 130. In other instances, the point deficit 142 may be managed apart from, but linked to, the particular customer account 132. The point deficit 142 may occur after a point borrowing offer is generated and accepted, and before the points have been repaid once they have been earned after the loan.

The loyalty account management application 110 can be a part of or associated with a loyalty management system or application, and is used to manage information related to and operation of a loyalty or rewards program offered by the financial institution. The loyalty account management application 110 can be used to allow customers to accumulate points based on transactions and account-related actions in an effort to provide benefits to customers, retain existing customers, and attract new customers. The loyalty account management application 110 may be operated or executed by the financial institution in the financial institution system 102 as illustrated, while in other instances, third parties or other entities, subsidiaries, or companies may manage loyalty or reward accounts for the financial institution. As illustrated, the loyalty account management application 110 can be associated with a loyalty account database 146, at which information associated with particular loyalty accounts can be stored and managed. The loyalty account database 146 may be a part of the financial account database 130, or it may be separate therefrom. Information related to the loyalty account management application 110 can be stored in any suitable location, but is illustrated as stored in the loyalty account database 146.

As illustrated, the loyalty account database 146 can store a plurality of loyalty accounts, each associated with an account identifier 148. The account identifier 148 can correspond directly to an identifier of a corresponding customer account 132 from the financial account database 130, or may be associated with a unique identifier for the corresponding loyalty account, which may be mapped to or otherwise related to or associated with a particular customer account 132 or accounts. Each account may be associated with a loyalty point balance 150, where the loyalty point balance 150 identifies a current amount of loyalty points available to the loyalty account and corresponding customer. Additionally, the loyalty account database 146 may associate a profile 152 with each particular account identifier 148. The profile 152 may include information about or related to the particular customer associated with the loyalty account. The profile 152 may include loyalty account-related preferences, among others. Further, the profile 152 may identify one or more reward goals 154 for the loyalty customer. In some instances, those goals 154 may be manually or explicitly selected by the customer as particular goals for which loyalty points may be redeemed in the future. In other instances, the loyalty management application 110 may, based on information in the profile 152 (e.g., demographic information and loyalty point redemptions of similar users, information on prior redemptions and loyalty rewards of the particular customer, etc.) and/or based on the profile 136 of the customer account 132 (e.g., prior purchases and transactions, etc.) may implicitly or dynamically identify one or more particular reward goals 154 for the customer associated with the account identifier 148 without the customer's explicit selection of the particular reward goal 154. Any suitable analysis system may be used. The loyalty account database 146 can further include a reward catalog 156 identifying one or more rewards and their corresponding point cost. The one or more rewards in the reward catalog can be for specific goods or services, discounts on purchases or transactions associated with one or more providers, or access to provider-specific goods or services, including some that may not be offered to the general public or non-customers of the financial institution. In some instances, the loyalty account management application 110 may allow the customer to view, via a client application 178 and/or a web browser, the rewards catalog 156, and to perform redemptions of particular rewards using available point values. The loyalty account management application 110, or any other suitable application, can allow the customer to select or identify particular rewards to be added as reward goals 154 to be used in a later analysis and potential offer. Additionally, based on browsing history, one or more items in the reward catalog 156 may be identified as potential reward goals 154.

The offer management application 112 can be associated with a tool used by the financial institution to identify and generate potential offers to customers based on any suitable combination of factors. The offer management application 112 may be associated with a separate offer management system, and may be associated with additional offers related to the financial institution, including offers for new credit cards, financial products, and other related items associated with the financial institution. In some instances, the offer management application 112 may be associated with or a part of either the account management application 108 and/or the loyalty account management application 110. In the present illustration, the offer management application 112 can perform operations and functionality associated with identifying and offering customers the opportunity to borrow an amount of loyalty points where the customer does not have the necessary points to purchase or redeem a particular reward goal 154. To do so, the offer management application 112 may be associated with a point lending engine 114. The point lending engine 114 can be used to perform the specific analysis described herein, particularly where the offer management application 112 is associated with additional and/or alternative operations including different types of offers for other products outside point lending. The point lending engine 114, as illustrated, can include a goal analyzer 116, an accounts interface 118, and an offer engine 120.

The goal analyzer 116 can perform operations associated with identifying one or more reward goals 154 identified by or for the customer. The goal analyzer 116 can access the loyalty account database 146 using an accounts interface 118, which can perform operations and authorizations required to access a loyalty account associated with a particular account identifier 148 and corresponding to a particular customer account 132. The identified reward goals 154 can be identified from the loyalty account profile 152, along with any point value costs associated with those rewards. The accounts interface 118 can also access the associated customer account 132 to identify any relevant customer information, including a customer profile 136, to identify information related to whether an offer should be made. An offer engine 120 of the point lending engine 114 can perform an analysis to determine whether a particular point loan offer is to be provided, and further, can perform operations associated with initiating the loan if accepted. In particular, the offer engine 120 may access or execute a set of offer rules 158 stored in memory 128. The offer rules 158 can define information identifying particular situations and rules where such borrowing offers may be generated. The offer rules 158 can be based on any suitable criteria, and may be fully customized on a customer-by-customer basis, as well as based on customer classifications (e.g., card types, demographic information, customer tier level, customer spending history, customer historical transactions, etc.). The offer rules 158 may include one or more offer requirements 160, which may determine whether a current context or requirement for an offer to be made. Such rules may include requirements for an amount of allowable prior account delinquencies, an amount of points a customer is allowed to go into deficit, a term that a particular point deficit must be "repaid", and other suitable offer requirements 160. Additionally, a set of offer thresholds 162 may be defined to determine when such an offer may be made. In some examples, an absolute number of points may be defined as a highest amount of points to be borrowed in any particular instance. For example, a particular rule may define a maximum amount of points to be offered as no more than 10,000 points in a single offer. That threshold 162 may dynamically increase or decrease based on any number of factors, including a customer's credit limit, expected spending and/or points earning over a particular period of time, or any other analytics 140 or information about the customer. For example, if a customer has only earned, at most, 400 points during each of the prior twelve periods, the maximum amount of points to be offered may be limited to 800 points, in total. Similarly, the thresholds 162 may include a relative amount of points to be allowed to be borrowed for any particular reward goal 154. For example, the threshold may be limited to 10% of the total point cost of the reward, in order to require the customer to provide at least some of the points based on account usage and point earning activities. Any other suitable business-based rules and logic regarding how and when to offer loans can be included in the offer rules, and may be at least partially defined in the offer thresholds 162. Similarly, a set of customer requirements 164 may be defined to ensure that only customers who meet certain customer criteria will receive such offers. In some instances, those requirements 164 may identify a particular minimum account age, a particular credit line amount for the account 132, or any other suitable requirement. In short, any suitable rule may be defined that allows the financial institution to identify customers with a type of creditworthiness as it relates to the points offer to ensure that such customers will continue to use the customer account 132 and earn enough to repay any point deficits. More generally, the offer engine 120 may also consider a current status of the customer account 132, such as a current period's spending, to estimate a number of points earned based on current activity. That expected point value may be used as an amount to be loaned, or may increase an allowable loan amount, particularly where those expected points exceed or come close to the amount potentially being loaned. Any other suitable offer rules 158 may be considered by the offer engine 120. In some instances, the offer consideration and analysis can be performed periodically at particular intervals. In some instances, the frequency of the analysis may increase based on the likelihood a particular customer may be offered to borrow points, or based on a relative ranking of customers. For example, a higher spender with a higher credit line may justify a more frequent analysis, as they may be more willing to accept the point loan. Alternatively, customers with whom the financial institution is looking to further engage and obtain additional business and transactions may be considered more often, thereby allowing the users to become more interested and/or sentimental to the card provider and/or the card associated with the offer.

A point balance processor 122 can perform operations associated with crediting loyalty point balances 150 when points are determined, as well as debiting loyalty point balances 150 when redemptions occur. To credit accounts, the point balance processor 122 may determine a spending amount of a customer during a particular period when points are assessed. In response to the transactions performed and/or the actions taken by the customer, the point balance processor 122 can identify points to be awarded, and can credit the corresponding loyalty point balance 150 of that customer. Similarly, when a reward is redeemed, whether in response to a particular balance loan offer or based on a customer selection and redemption without an offer, the point balance processor 122 can debit the loyalty point balance 150 accordingly. In instances where the point offer is accepted, such that the points used for a transaction exceed those included in the loyalty point balance 150, the point balance processor 122 can update a point deficit field 142 in the financial account database 130 after debiting the whole of the current loyalty point balance 150 to zero. In doing so, the point balance processor 122 ensures that the amount of points loaned to the customer is accurately reflected within the customer account 132, and can be considered after future allocations of new points are performed after the next period or cycle is complete. The point deficit 142 can be considered during those future allocations, and any points earned during the period can be reduced when applied to the loyalty point balance 150 until the point deficit 142 is zero again. In some instances, a remaining deficit may still exist after one or more point allocations. Any earned points can be applied to the point deficit 142 until fully reduced to zero, when any additional points can then be credited to the loyalty point balance 150 again.

The point balance processor 122 can perform the operations using a batch process performed at the end of each billing or account cycle. A batch file or process can be used to evaluate the point deficit 142 for each customer account 132 among a plurality of customer accounts 132. If the point deficit 142 is zero, then the batch process can move to the next customer account 132. If the point deficit 142 is not zero, however, the batch process can attempt to debit the point deficit 142 from any newly added points in the loyalty point balance 150. If there are more new points than the point deficit 142, the point deficit 142 can be adjusted to zero while a corresponding number of points are debited from the loyalty point balance 150. If the point deficit 142 is greater than the amount of new points, then the entirety of the new points are reduced to zero, and the point deficit 142 is reduced by the corresponding amount. The process can be performed for that customer account 132 after the next account cycle to attempt to reduce the point deficit 142 to zero. The process of repaying the borrowed points may take multiple cycles. Each time the batch process is ran, a similar process can be performed until that customer account 132 has a point deficit 142 of zero. Once the processing for the current account 132 is complete, the batch process can continue with the next account 132 to be considered.

The statement processor 124 can perform operations to generate one or more statements 144 for customers. In particular, the statements 144 include information on an account balance 134 of the customer from a customer account 132 and a loyalty point balance 150 from a loyalty account having an account identifier 148 that is linked or corresponds to the customer account 132. In instances where a point deficit exists, however, additional operations must occur. First, the statement processor 124 is updated or instructed, when initially accessing the customer account 132, to determine whether a point deficit other than zero exists. In some instances, the analysis may determine whether a point deficit field 142 is created and includes a value other than 0. If so, a point deficit may exist, and should be included by the statement processor 124 in the currently generated statement 144. In doing so, the statement processor 124 can identify the current deficit, insert that information into the generated statement 144, and provide the updated statement 144 to the customer, where the statement 144 includes information on the account balance 134 of the customer account 132, the current loyalty point balance 150 of the customer (which is likely zero if a deficit exists, although the amount may be greater than zero if point reconciliation is performed by the point balance processor 122 before statement generation), and any point deficit 142 identified for the customer account 132. The statement processor 124 may be software or a process associated with a third-party vendor apart from the financial institution system 102, where the statement processor 124 can access the relevant customer accounts 132 in the financial account database 130 and the loyalty point balances 150 in the loyalty account database 146.

Memory 128 of the financial institution system 102 may represent a single memory or multiple memories. The memory 128 may include any memory or database module and may take the form of volatile or non-volatile memory including, without limitation, magnetic media, optical media, random access memory (RAM), read-only memory (ROM), removable media, or any other suitable local or remote memory component. The memory 128 may store various objects or data, including financial data, user and/or account information, administrative settings, password information, caches, applications, backup data, repositories storing business and/or dynamic information, and any other appropriate information associated with the financial institution system 102, including any parameters, variables, algorithms, instructions, rules, constraints, or references thereto. Additionally, the memory 128 may store any other appropriate data, such as VPN applications, firmware logs and policies, firewall policies, a security or access log, print or other reporting files, as well as others. While illustrated within the financial institution system 102, memory 128 or any portion thereof, including some or all of the particular illustrated components, may be located remote from the financial institution system 102 in some instances, including as a cloud application or repository, or as a separate cloud application or repository when the financial institution system 102 itself is a cloud-based system. In some instances, some or all of memory 128 may be located in, associated with, or available through one or more other financial systems of the associated financial institution. In those examples, the data stored in memory 128 may be accessible, for example, via one of the described applications or systems. As illustrated and previously described, memory 128 includes the financial account database 130, the loyalty account database 146, and the offer rules 158, among others.

As illustrated, one or more clients 170 may be present in the example system 100. Each client 170 may be associated with one or more customer accounts 132, either as a client device at which the customer of the customer account 132 is linked, or as a client device through which the particular customer accesses financial information and can interact with one or more offers for a point balance loan. As illustrated, the client 170 may include an interface 172 for communication (similar to or different from interface 104), at least one processor 174 (similar to or different from processor 106), a graphical user interface (GUI) 176, a client application 178, and a memory 180 (similar to or different from memory 128).

The illustrated client 170 is intended to encompass any computing device such as a desktop computer, laptop/notebook computer, mobile device, smartphone, personal data assistant (PDA), tablet computing device, one or more processors within these devices, or any other suitable processing device. In general, the client 170 and its components may be adapted to execute any operating system, including Linux, UNIX, Windows, Mac OS®, Java™, Android™, or iOS. In some instances, the client 170 may comprise a computer that includes an input device, such as a keypad, touch screen, or other device(s) that can interact with one or more client applications, such as one or more dedicated mobile applications, including a mobile wallet or other banking application, and an output device that conveys information associated with the operation of the applications and their application windows to the user of the client 170. Such information may include digital data, visual information, or a GUI 176, as shown with respect to the client 170. Specifically, the client 170 may be any computing device operable to communicate with the financial institution system 102, other clients 170, and/or other components via network 165, as well as with the network 165 itself, using a wireline or wireless connection. In general, client 170 comprises an electronic computer device operable to receive, transmit, process, and store any appropriate data associated with the environment 100 of FIG. 1.

The client application 178 executing on the client 170 may include any suitable application, program, mobile app, or other component. Client application 178 can interact with the financial institution applications (e.g., account management application 108, loyalty account management application 110, and offer management application 112) and the financial institution system 102 via network 165. In some instances, the client application 178 may be a web browser, where the functionality of the client application 178 may be realized using a web application or website the user can interact with via the client application 178. In other instances, the client application 178 may be a remote agent, component, or client-side version of the financial institution system 102 and/or any of its individual components. In some instances, the client application 178 may interact directly with the financial institution system 102 or portions thereof. The client application 178 may be used to view, interact with, and accept or decline one or more point lending offers based on user input, and/or may be used to present information associated with the operations of the point balance offer and lending analysis after it is triggered.

GUI 176 of the client 170 interfaces with at least a portion of the environment 100 for any suitable purpose, including generating a visual representation of any particular client application 178, and/or the content associated with any components of the financial institution system 102. In particular, the GUI 176 may be used to present results of a point lending analysis, including providing one or more offers to the customer at the client 170, as well as to otherwise interact and present information associated with one or more applications. GUI 176 may also be used to view and interact with various web pages, applications, and web services located local or external to the client 170. Generally, the GUI 176 provides the user with an efficient and user-friendly presentation of data provided by or communicated within the system. The GUI 176 may comprise a plurality of customizable frames or views having interactive fields, pull-down lists, and buttons operated by the user. In general, the GUI 176 is often configurable, supports a combination of tables and graphs (bar, line, pie, status dials, etc.), and is able to build real-time portals, application windows, and presentations. Therefore, the GUI 176 contemplates any suitable graphical user interface, such as a combination of a generic web browser, a web-enable application, intelligent engine, and command line interface (CLI) that processes information in the platform and efficiently presents the results to the user visually.

In some instances, portions of the interactions and financial institution system's 102 data may be stored remotely within memory 180. As illustrated, memory 180 may store information related to a current set of rewards goals 182 identified by the customer associated with client 170, as well as a current reward status 184 of the customer. In some instances, additional information from either the financial account database 130 and/or the loyalty account database 146 associated with the corresponding customer account 132 and loyalty account of the customer may be stored locally at memory 180 for use by the client application 178. In some instances, the client application 178 may be associated with a mobile wallet, and can be used to store a set of mobile wallet data, including information related to one or more cards and/or accounts, including in some instances, any associated loyalty account information.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

FIGS. 2A-D represent a set of situational diagrams illustrating an example identification, offer, and implementation of a lending offer for providing loyalty points to users based on an account analysis and one or more predefined goals. The illustrated figures illustrate a separate financial system 202, loyalty management system 204, offer management system 206, customer 208 (e.g., at a customer device), a point balance processor 210, and a statement processor 212. In illustrated FIG. 1, those components are all illustrated within the financial institution system 102. FIGS. 2A-D illustrate an alternative implementation, where the different components may be separate or remote from one another. Other implementations, however, may combine one or more of the components.

As illustrated in FIG. 2A, at 1a and 1b, the offer management system 206 determines whether or not a point lending offer is to be generated. The point lending offer analysis may be performed by the offer management system 206 at particular intervals or periods, in response to customer action (e.g., an indication of a customer reviewing a rewards catalog, in response to a purchase or transaction performed by the customer related to a good or service included in or related to a reward goal, in response to a loyalty program login, etc.). The offer management system 206 may consider one or more offer rules associated with a points loan offer, where at least some of the offer rules are specific to the customer and some are generally applied to all customers. At 1a, the offer management system 206 can identify information stored in a financial system 202 associated with a particular customer, including an account balance (e.g., $10K), and whether a current points deficit exists, as well as one or more analytical or historical sets of information associated with the customer. Additionally, at 1b, the offer management system 206 can access the loyalty management system 204 to determine an existing point balance (e.g., 5800 points) and whether any existing reward goals have been identified for the customer 208 and their associated loyalty account. In the initial illustration, a reward X has been identified as a reward goal, with a required point value of 6000 points. In other words, 200 points more than the customer current has available.

At 2, the offer management system 206 can determine that, based on the offer rules and an analysis of the customer accounts, an offer to loan the customer 208 points is to be generated and transmitted, via a communications module, to the customer 208. The offer is generated and transmitted to the customer in a corresponding signal at 2, where the customer can then consider and respond to the offer. At 3, the customer 208 can accept the offer of the point loan, and a second signal including an indication of the acceptance can be provided to the offer management system 206.

Turning to FIG. 2B, different implementations may cause the offer management system 206 or a point balance processor 210 to initialize or instruct the points to be provided, via the point loan offer, to the loyalty management system 204 (at 4). In some instances, the offer management system 206 or a separate point balance processor 210 can instruct the financial system 200 to enter a points deficit corresponding to the loan offer. Based on that loan, the financial system 202 can then register the point deficit of 200 points in association with the account balance. In some instances, the point deficit may be stored in a custom-defined field, such as those available in association with the customer account. Those fields may be dedicated to the point deficit for all customers, or the field may be defined in response to the acceptance of a point balance loan by the particular customer.

In combination with the indication of the point deficit, a corresponding increase to the loyalty point balance at the loyalty management system 204 (e.g. a 200 point increase to 6000 total points) can be indicated (by 5). In some instances, the financial system 202 may notify and instruct the increase in points after increasing the point deficit. In other instances, instructions to increase the point deficit and credit the point balance of the loyalty account can be sent by the offer management system 206 or the point balance system 210 directly, and in some cases, concurrently or sequentially.

After the loyalty point balance is increased, a redemption process can be performed by the customer to redeem the reward associated with the reward goal (at 6), and any suitable redemption process or action can be performed. In some cases, the reward may be automatically and immediately redeemed, while in others the customer may need to manually or interactively submit and agree to the terms of the redemption. Once the reward is redeemed, the point balance is reduce from the previously increased value of 6000 to zero (0). At 7, the customer 208 can be notified of the changes to the accounts based on the loan payout and the redemption of the reward corresponding to the prior reward goal.

Turning to FIG. 2C, at the end of a billing period, the point balance processor 210 (or the financial system 202 itself) can perform a process for crediting a loyalty account based on any activity performed during that billing period that results in the awarding of loyalty points. That activity may include, but is not limited to, spending associated with the customer account, travel or other linked events performed by the customer and associated with or considered by the loyalty account, or any other registered and associated activity or action. Based on the activity and points award, the financial system 202 or the point balance processor 210 can determine an amount of points to be added to the loyalty account. In the present example, the customer may have paid off their prior account balance of $10K, but has added new spending of $7K to the account. Based on the activity, the financial system 202 and/or the point balance processor 210 can determine that 600 points should be credited to the customer's loyalty account (at 8), and a corresponding instruction or signal can be transmitted to the loyalty management system 204 to credit the account (to 600 from 0, as shown).

At 9, the point balance processor 210 can assess whether the account of each customer in the financial system 202 is associated with a point deficit. This analysis may be executed as a batch file or process, and can evaluate the point deficit (or if a point deficit field is present or defined) for each customer account. If the point deficit exists, then the point balance processor 210 can perform a debit from the updated loyalty point balance in an effort to reduce the point deficit to zero. In the illustrated example, the point balance processor 210, at 10, can instruct the loyalty management system 204 to debit the loyalty point balance from 600 to 400 points. In turn, the loyalty management system 204, as instructed by the point balance processor 210, can provide an instruction (at 11) to the financial system 202 to credit the point deficit by 200, in this case wiping out the existing deficit. In some instances, the point balance processor 210 can issue the instructions to debit the loyalty point balance (10) and credit the point deficit (as instructed at 11) itself, and may do so sequentially (e.g., debit first, then credit after successful debiting) or concurrently. As the reconciliation in this instance is complete, the point deficit returns to 0, and the loyalty point balance moves to an updated 400 points from the prior 600 points.

FIG. 2D illustrates an alternative result to FIG. 2C, where, after the point reconciliation process of the point balance processor 210, the point deficit of the financial system remains at 100 points, where the points earned during this period were not enough to repay the full amount of borrowed points. In particular, FIG. 2D starts when a statement is being generated by a statement processor 212 associated with the financial system 202 and the loyalty management system 204. As the statement is being generated, the statement processor 212 can access the financial system 202 for its account balance and to determine whether a point deficit exists (at 12a), as well as the loyalty management system 204 for its point balance (at 12b). If the statement processor 212 determines that a point deficit exists or is present after the prior point reconciliation process, the statement generation process can be interrupted, and any point deficit information can be inserted into the generated statement. The statement processor 212 can generate the statement (at 13), and can transmit, via a communications interface, a signal including the generated statement to the customer 208 (at 14), where the generated statement includes information detailing the current account balance ($7K), the current point deficit (100), and the current loyalty point balance (0).

Figure 3:
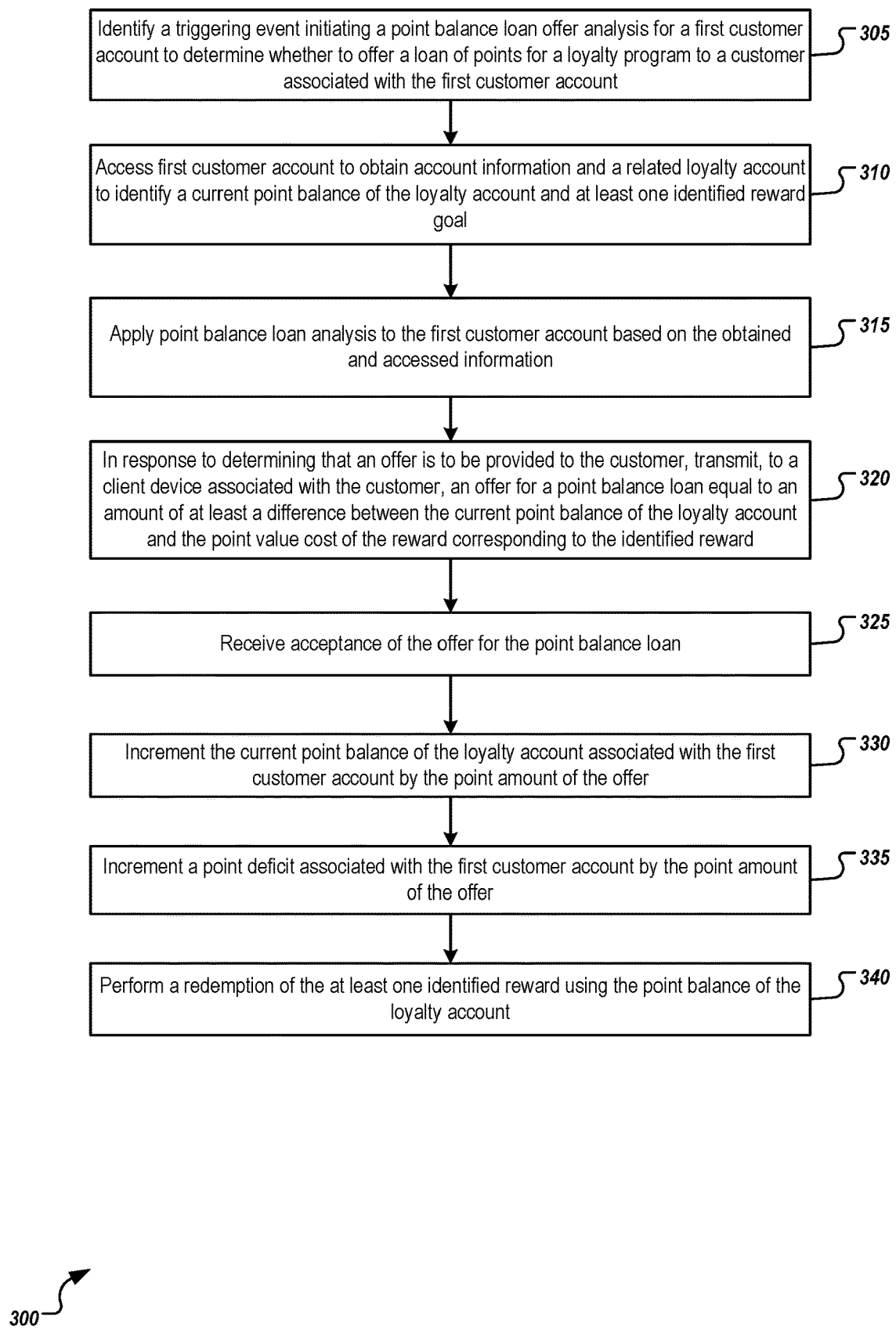
FIG. 3 is a flow diagram of an example method for automatically identifying, providing, and implementing a lending offer for providing loyalty points to users based on an account analysis and one or more predefined goals in one example implementation.

FIG. 3 is a flow diagram of an example method 300 for automatically identifying, providing, and implementing a lending offer for providing loyalty points to users based on an account analysis and one or more predefined goals in one example implementation. However, it will be understood that method 300 may be performed, for example, by any other suitable system, environment, software, and hardware, or a combination of systems, environments, software, and hardware as appropriate. In some instances, method 300 can be performed by the financial institution system 102, or portions thereof, described in FIG. 1, as well as other components or functionality described in other portions of this description. In other instances, method 300 may be performed by a plurality of connected components or systems, such as those illustrated in FIG. 2A-D. Any suitable system(s), architecture(s), or application(s) can be used to perform the illustrated operations.

In one instance, method 300 describes a method performed within a system of a financial institution or card provider comprising a communications module, at least one memory, and at least one hardware processor interoperably coupled with the at least one memory and the communications module. The at least one memory can include a repository storing a plurality of customer accounts for one or more customers, a repository storing a catalog of rewards associated with a loyalty program, and a repository storing a plurality of loyalty accounts associated with the loyalty program. Each customer account in the plurality of customer accounts can be associated with a particular customer, wherein the customer account stores at least an account balance and a point deficit balance, as well as in some instances information about customer spending, transactions, and analytics, as well as a customer profile. Each reward in the catalog of rewards corresponds to a point value cost that may be redeemed or purchases using, in whole or in part, loyalty points from the loyalty account. Each loyalty account can correspond to at least one customer account of the plurality of customer accounts, and each loyalty account may store or be associated with a current point balance and at least one reward identified as a potential reward goal for the customer of the corresponding customer account. In some instances, the at least one reward is a reward from the reward catalog, and may be manually identified by or automatically determined for the particular customer associated with the loyalty account. The manual identification may be a selection or listing performed by the customer, such as on or through a client device of the customer. The automatic identification may be determined based on a customer analysis, including but not limited to an analysis of prior transactions, prior loyalty redemptions, and activities associated with the customer account, including calendar events from an account associated with the customer account. The memory may also store instructions that instruct the at least one hardware processor to perform particular operations.

Turning to method 300, at 305 a triggering event initiating a point balance loan offer analysis for a first customer account can be identified. The point balance loan offer analysis can be an analysis of the customer account and related loyalty account to determine whether to offer the customer a loan of loyalty points for a loyalty program in order to achieve or reach a point amount corresponding to the at least one identified reward goal. In some instances, the triggering event may be a periodic account analysis, either specific to the first customer account or a batch process performed across some or all of the plurality of accounts. In some instances, the triggering event may be a manual request from the customer (e.g., via a loyalty program application). In other instances, one or more account events may trigger the analysis, such as a large transaction being processed, a determination that the customer reviews the rewards catalog, or any other suitable event. In some instances, the trigger may be initiated by an offer management system.

At 310, a set of relevant customer account information and loyalty account information can be accessed in order to perform the point balance loan offer analysis. The set of information relevant to the analysis may include any information relevant to the loan program, and may be defined or determined by a set of point balance loan offer rules managed by an offer management system. In the illustrated example, the first customer account can be accessed to obtain account information of the customer and information from a related loyalty account. The loyalty account information obtained can include a current point balance of the loyalty account and at least one identified reward goal, including the point value cost of the reward associated with the reward goal. In the current solution, the reward may be associated with a complete purchase of the reward, while in others, the reward may represent a discount or partial payment of a good or service, where when redeemed, the reward reduces the cost or payment required for the good or service.

At 315, the point balance loan analysis is applied to the first customer account based on the information accessed and obtained at 310. Any suitable analysis can be performed to determine whether to generate an offer to the customer associated with the first customer account.

In some instances, determining whether point balance loan offer is to be provided to the customer associated with the first customer account may include determining whether a difference between the point value cost of the identified reward is within a threshold range above the current point balance of the loyalty account. In response to determining that the difference is within the threshold range, a determination can be made that the point balance loan offer is to be provided to the customer. In those instances, the threshold range can be defined within one or more offer rules, and may vary based on information regarding the particular customer or information from the customer account. For example, if the customer is a regular user of the customer account (e.g., a credit card account), then a lower threshold may be used as the customer is likely to earn the necessary points in the future. Similarly, a light user of the customer account may require a smaller threshold range to ensure that the points are earned over a reasonable period of time in the future. In some instances, the analysis may further consider a transaction amount required to meet the point value cost of the identified reward in combination with one or more additional factors, including a customer's frequency of use of the associated account, including frequency as it relates to particular events, dates, or seasons. For example, the threshold may differ in times nearer to a holiday season, where customer history indicates that the customer is more likely to earn a significant amount of point in the relatively near future based on prior spending. In those instances, an offer for a larger amount of points may be suitable nearer to a holiday season, as the time to recover the loaned points may be earned relatively quickly, even where recent transactions and point earning may be otherwise lower. Predictive modeling of likely customer actions may be performed throughout the process, where the predictive modeling is based on the customer's prior actions, other customers' historical actions (e.g., similar customers or cohorts), as well as any other information. In some instances, other information may indicate a change in thresholds, including an identification of additional income or inflows into one or more related or associated accounts, such as a checking account of the customer. In some instances, an analysis of a likely break-even or catch-up time to repay any loan may be considered, and may be applied to the customer. In some instances, the break-even time may be defined by a lender, and can then be evaluated for each customer. If the break-even time is 2 account cycles, then a determination can be made as to the likely point earning of the customer over the next two cycles. The threshold amount may be any amount beneath that break-even time as determined for the particular customer. Any other suitable analysis mechanism or consideration can be used.

In some instances, determining whether the point balance loan offer is to be provided to the customer may include determining, from an analysis of transactions associated with the first customer account, whether the difference between the point value cost of the reward associated with the identified reward and the current point balance of the loyalty account has already been earned by the first customer account but has not been allocated during a current account period. For example, if a current month's spending is determined to cover the point amount of the potential loan, or at least a large percentage of that loan, then a determination may be made that the point balance loan offer is to be provided to the customer. In some instances, multiple levels of account and customer checks may be required before an offer is confirmed. In some instances, the analysis may be similar to a creditworthiness analysis performed for an account, but based on likely transactions to be performed and the ability of the customer to "repay" the borrowed points from points to be earned at a later time.

At 320, in response to determining that an offer is to be made to the customer, an offer for a point balance loan equal to an amount of at least a difference between the current point balance of the loyalty account and point value costs of the identified reward can be transmitted, via a communications module, to a client device associated with the customer. The customer can view the offer, including any related disclosures and terms, at the client device, and can return an acceptance of the offer. The amount of the point loan offer may differ, and may be more than the amount needed for the particular identified reward. Generally, the offer will be for at least the amount required to bring the point balance of the loyalty account to at least that of the point value cost of the reward. However, in some instances, less than the full amount may be included in the offer, such as when an amount to be earned in a current account period is determinable. In those instances, the difference between the earned but not allocated point amounts and the additional points needed may be offered to the customer. At 325, acceptance of the offer for the point balance loan may be received.

In response to the acceptance, method 300 continues to 330, where instructions to increment or increase the current point balance of the loyalty account associated with the first customer account to the point amount of the offer are issued or sent to the corresponding loyalty system. In connection with those instructions, instructions can be sent to the first customer account to increment a point deficit associated with the first customer account by the point amount of the offer. The point deficit of the first customer account may be pre-defined field within the first customer account, or it may be a custom-defined field initialized and filled based on the accepted offer.

Once the point balance and the point deficit are updated, method 300 can, in some instances, perform a redemption action for the at least one identified reward using the updated point balance in the loyalty account. The point balance, in response to the redemption, can then be reduced by the amount of the point value cost of the reward. In some instances, the redemption may be performed automatically after the acceptance of the offer and updates to the accounts, while in others, the customer may be required to perform further activities to cause the redemption to occur.

Figure 4:
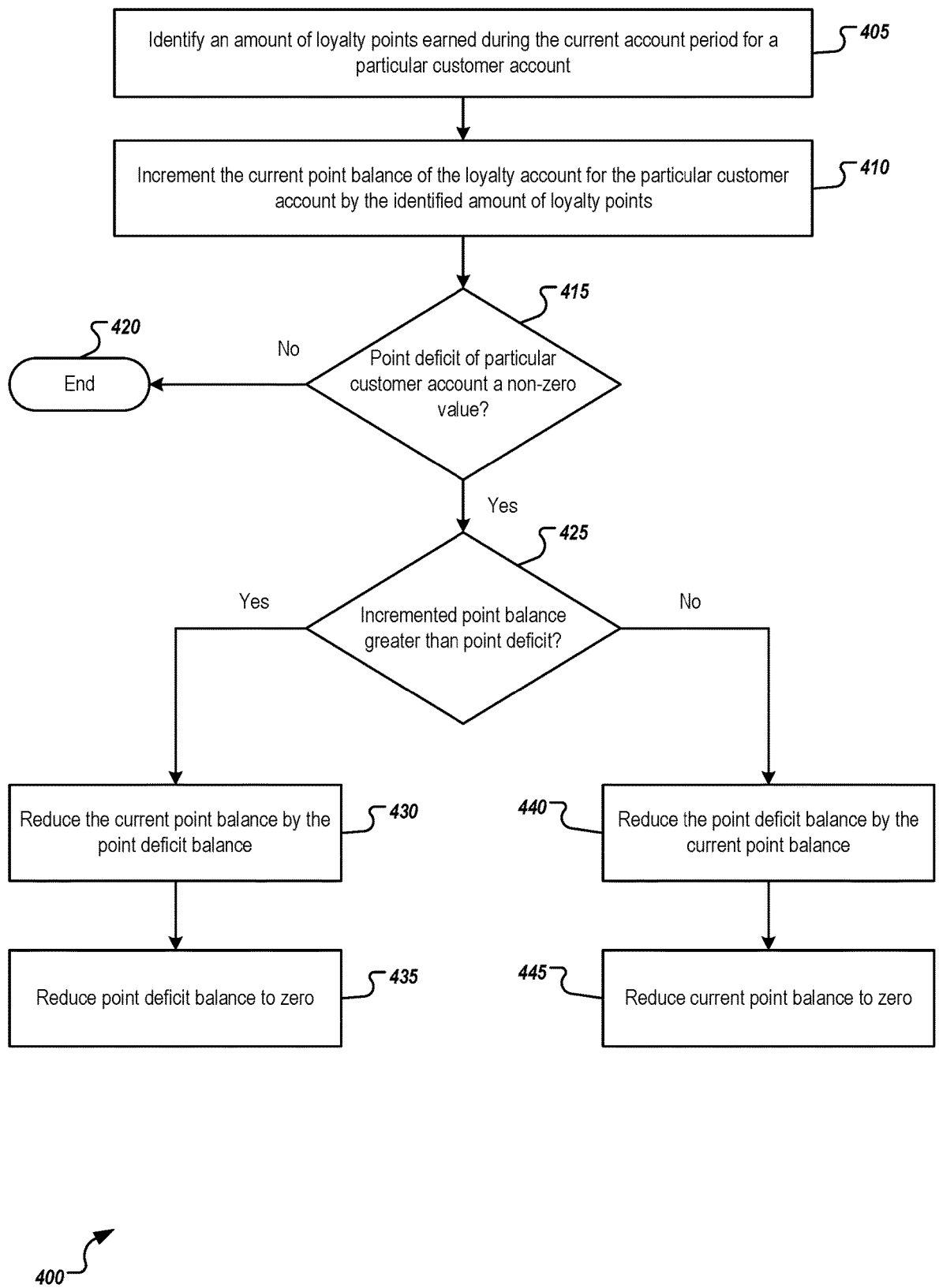
FIG. 4 is a flow diagram of an example method for performing a point reconciliation process at the end of an account period.

FIG. 4 is a flow diagram of an example method 400 for performing a point reconciliation process at the end of an account period, such as a billing period. The operations of method 400 can be performed after those of method 300, where at least one point balance loan has been provided to, accepted by, and implemented for one of the plurality of customer accounts. However, it will be understood that method 400 may be performed, for example, by any other suitable system, environment, software, and hardware, or a combination of systems, environments, software, and hardware as appropriate. In some instances, method 400 can be performed by the financial institution system 102, or portions thereof, described in FIG. 1, as well as other components or functionality described in other portions of this description. In other instances, method 400 may be performed by a plurality of connected components or systems, such as those illustrated in FIG. 2A-D. Any suitable system(s), architecture(s), or application(s) can be used to perform the illustrated operations. In some instances, method 400 may be performed as part of a batch process performed for each of the plurality of customer accounts, where some customer accounts may not have been offered or have not accepted a point balance loan.

At 405, an amount of loyalty points earned during the current or just prior account period for a particular customer account can be identified. The amount of points earned may be based on transactions performed during the current account period, point-earning activities other than transactions performed, or any other point-earning event or interaction during the account period. At 410, the current point balance of the loyalty account associated with the particular customer account can be incremented by the identified amount, and an updated current point balance can be stored or provided.

At 415, a determination can be made as to whether a point deficit is currently present or associated with the particular customer account. The determination may be based on an accessing of the information stored in the particular customer account. If no point deficit is included in or associated with the particular customer account, then the point reconciliation process for that particular customer can be ended, and method 400 can continue to 420 where the customer-specific reconciliation ends. Additional operations for others of the plurality of customer accounts can be performed, if necessary.

In response to determining that a point deficit is a non-zero value for the particular customer account, method 400 continues to 425. At 425, a determination is made as to whether the incremented and updated point balance for the loyalty account is greater than the identified point deficit. If so, method 400 continues at 430; if not, method 400 continues at 440.

At 430, where the point balance is greater to or equal than the point deficit, the current point balance is reduced by the point deficit, and at 435, the point deficit is reduced to zero to indicate that the loan has been fully repaid.

At 440, in response to determining that the point balance is less than the point deficit, the point deficit balance is reduced by the point balance to show a decreased, but still existing, point deficit. The current point balance, because it has all be used to reduce the point deficit, can be reduced to zero at 445. In future account periods or cycles, the newly earned loyalty points can be applied to the remaining point deficit balance until the point deficit is zero.

A statement generation process may also be performed after the point reconciliation method 400. The statement generation process may be performed individually for each customer account, or as a part of a batch process performed across each of the plurality of customer accounts. The statement generation process may be a typical statement generation process obtaining information included in each of the customer account and loyalty account for each customer. The standard process can be updated, however, to be interrupted when a point deficit is identified when reviewing the customer account. When the point deficit is detected, the statement generation process can interrupts its standard process and perform a determination of the exact point deficit. Using the determined point deficit, the value of the point deficit balance can be inserted into and included in the generated statement. Once generated, the statement can be stored in association with the customer account and/or transmitted, via a communications module, to a client device associated with the corresponding customer.

The preceding figures and accompanying description illustrate example processes and computer-implementable techniques. However, system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. An offer management system comprising:
   at least one memory storing instructions; and
   at least one hardware processor interoperably coupled with the at least one memory, wherein the instructions instruct the at least one hardware processor to:
      identify a triggering event initiating a point balance loan offer analysis for a first customer account associated with a customer from among a plurality of customer accounts associated with a plurality of customers;
      in response to the identified triggering event, apply the point balance loan offer analysis to the first customer account, wherein applying the point balance loan offer analysis to the first customer account comprises:
         determining, based on data obtained from the first customer account and data obtained from a loyalty account corresponding to the first customer account, to offer the customer a loan of points to be added to the current point balance of the loyalty account;
      in response to determining to offer the customer associated with the first customer account the loan of points, transmit, to a client device associated with the customer, an offer of a point balance loan equal to an amount of at least a difference between a current point balance of the loyalty account and the point value cost of the reward; and
      in response to receiving, from the client device, an acceptance of the offer, transmit, to the loyalty management system, an instruction to increment the current point balance of the loyalty account associated with the first customer account by the amount of the offer and transmit, to the financial system, an instruction to increment a point deficit balance of the first customer account by the amount of the offer;
      performing a redemption of the at least one identified reward in the loyalty account using the point value of the at least one identified reward from the incremented point balance of the loyalty account, wherein the point balance of the loyalty account is decremented by the point value of the at least one identified reward; and
   in response to detecting an end of an account period, triggering an automatic statement generation process for each of the plurality of customer accounts including the first customer account, comprising:
      automatically and without user input, configuring a point balance processor of the loyalty management system to increment the current point balance of the loyalty account corresponding to the customer account by an amount of loyalty points earned during the account period and (2) in response to determining that the point deficit balance of the first customer account is not zero, decrement the current point balance of the loyalty account corresponding to the customer account to reduce the value of the point deficit balance of the first customer account;
      in response to determining that the point deficit balance obtained from the financial system is greater than the incremented current point balance of the loyalty account, automatically and without user input, configuring a point balance processor of the loyalty management system decrement the current point balance of the loyalty account to reduce the value of the point deficit balance of the first customer account;
      automatically and without user input, configuring a statement processor to generate for the customer account, a statement specifying (1) a current account balance of the customer account received from the financial system and (2) a current point balance of the loyalty account corresponding to the customer account received from the loyalty management system; and
      in response to detecting that the point deficit balance of the customer account is non-zero, interrupting the statement generation to insert the value of the point deficit balance into the generated statement.

2. The system of claim 1, wherein the triggering event initiating the point balance loan offer analysis for the first customer account comprises a periodic account review of each of the plurality of customer accounts.

3. The system of claim 1, wherein decrementing the current point balance of the loyalty account to reduce the value of the point deficit balance of the first customer account, when the point deficit balance of the first customer account is greater than the incremented current point balance of the loyalty account, comprises:
   reducing the point deficit balance of the first customer account by the incremented current point balance of the loyalty account; and
   reducing the incremented current point balance of the loyalty account to zero.

4. The system of claim 1, wherein the statement generation process comprises a batch process performed for each of the customer accounts at the end or close of the account period.

5. The system of claim 1, wherein decrementing the current point balance of the loyalty account to reduce the value of the point deficit balance of the first customer account, when the point deficit balance of the first customer account is less than the incremented current point balance of the loyalty account, comprises:
   reducing the incremented current point balance by the point deficit balance to a new current point balance; and
   reducing the point deficit balance of the first customer account to zero.

6. The offer management system of claim 1, wherein the instructions instruct the at least one hardware processor to perform operations comprising:
   obtaining, from a financial system, data for the first customer account, including an account balance, a points deficit balance, and past and present spending activity associated with the customer account; and
   obtaining, from a loyalty management system, data for a loyalty account corresponding to the first customer account, wherein the data for the loyalty account includes a current points balance and a rewards goal that identifies a reward and a points value cost of the one reward.

7. The offer management system of claim 1, wherein the instructions instruct the at least one hardware processor to perform operations comprising:
   identifying a threshold range against which a difference between the current point balance and the point value cost is compared in evaluating whether to make an offer for a points balance loan; and
   dynamically adjusting the threshold range to obtain an updated threshold range based on the data obtained from the financial system and loyalty management system, including frequency of use of the customer account, the past and present spending activity associated with the customer account, a creditworthiness of the customer, and an age of the credit account.

8. The offer management system of claim 7, wherein dynamically adjusting the threshold range to obtain the updated threshold range comprises:
   dynamically adjusting the threshold range to obtain an updated threshold range based on the data obtained from the financial system and loyalty management system, including frequency of use of the customer account, the past and present spending activity associated with the customer account, a creditworthiness of the customer, and an age of the credit account.

9. The offer management system of claim 8, wherein dynamically adjusting the threshold range to obtain the updated threshold range based on the data obtained from the financial system and loyalty management system, comprises:
   determining that the current point balance is less than the point value cost of the reward;
   determining that the difference between the current point balance and the point value cost of the reward is within the updated threshold range; and
   in response to determining that the difference is within the updated threshold range, determining to offer the customer a loan of points to be added to the current point balance of the loyalty account.

10. A non-transitory, computer-readable medium storing computer-readable instructions executable by a computer of an offer management system and configured to:
    identify a triggering event initiating a point balance loan offer analysis for a first customer account from a plurality of customer accounts, wherein each customer account in the plurality of customer accounts is associated with a particular customer;
    in response to the triggering event, apply the point balance loan offer analysis to the first customer account, wherein applying the point balance loan offer analysis to the first customer account comprises determining, based on data obtained from the first customer account and data obtained from a loyalty account corresponding to the first customer account, to offer the customer a loan of points to be added to the current point balance of the loyalty account;
    in response to determining to offer the customer associated with the first customer account the loan of points, transmit, to a client device associated with the customer, an offer of a point balance loan equal to an amount of at least a difference between a current point balance of the loyalty account and the point value cost of the reward;
    in response to receiving, from the client device, an acceptance of the offer, transmit, to the loyalty management system, an instruction to increment the current point balance of the loyalty account associated with the first customer account by the amount of the offer and transmit, to the financial system, an instruction to increment a point deficit balance of the first customer account by the amount of the offer;
    performing a redemption of the at least one identified reward in the loyalty account using the point value of the at least one identified reward from the incremented point balance of the loyalty account, wherein the point balance of the loyalty account is decremented by the point value of the at least one identified reward; and
    in response to detecting an end of an account period, triggering an automatic statement generation process for each of the plurality of customer accounts including the first customer account, comprising:
       automatically and without user input, configuring a point balance processor of the loyalty management system to increment the current point balance of the loyalty account corresponding to the customer account by an amount of loyalty points earned during the account period and (2) in response to determining that the point deficit balance of the first customer account is not zero, decrement the current point balance of the loyalty account corresponding to the customer account to reduce the value of the point deficit balance of the first customer account;
       in response to determining that the point deficit balance obtained from the financial system is greater than the incremented current point balance of the loyalty account, automatically and without user input, configuring a point balance processor of the loyalty management system decrement the current point balance of the loyalty account to reduce the value of the point deficit balance of the first customer account;
       automatically and without user input, configuring a statement processor to generate for the customer account, a statement specifying (1) a current account balance of the customer account received from the financial system and (2) a current point balance of the loyalty account corresponding to the customer account received from the loyalty management system; and
       in response to detecting that the point deficit balance of the customer account is non-zero, interrupting the statement generation to insert the value of the point deficit balance into the generated statement.

11. The computer-readable medium of claim 10, wherein the triggering event initiating the point balance loan offer analysis for the first customer account comprises a periodic account review of each of the plurality of customer accounts.

12. The computer-readable medium of claim 10, wherein decrementing the current point balance of the loyalty account to reduce the value of the point deficit balance of the first customer account, when the point deficit balance of the first customer account is greater than the incremented current point balance of the loyalty account, comprises:
    reducing the point deficit balance of the first customer account by the incremented current point balance of the loyalty account; and
    reducing the incremented current point balance of the loyalty account to zero.

13. The computer-readable medium of claim 10, wherein the statement generation process comprises a batch process performed for each of the customer accounts at the end or close of the account period.

14. The computer-readable medium of claim 10, wherein decrementing the current point balance of the loyalty account to reduce the value of the point deficit balance of the first customer account, when the point deficit balance of the first customer account is less than the incremented current point balance of the loyalty account, comprises:
reducing the incremented current point balance by the point deficit balance to a new current point balance; and
reducing the point deficit balance of the first customer account to zero.

15. The non-transitory, computer-readable medium of claim 10, wherein the computer-readable instructions executable by the computer are configured to:
obtain, from a financial system, data for the first customer account, including an account balance, a points deficit balance, and past and present spending activity associated with the customer account; and
obtain, from a loyalty management system, data for a loyalty account corresponding to the first customer account, wherein the data for the loyalty account includes a current points balance and a rewards goal that identifies a reward and a points value cost of the one reward.

16. The non-transitory, computer-readable medium of claim 10, wherein the computer-readable instructions executable by the computer are configured to:
identify a threshold range against which a difference between the current point balance and the point value cost is compared in evaluating whether to make an offer for a points balance loan; and
dynamically adjust the threshold range to obtain an updated threshold range based on the data obtained from the financial system and loyalty management system, including frequency of use of the customer account, the past and present spending activity associated with the customer account, a creditworthiness of the customer, and an age of the credit account.

17. The non-transitory, computer-readable medium of claim 16, wherein dynamically adjusting the threshold range to obtain the updated threshold range comprises:
dynamically adjusting the threshold range to obtain an updated threshold range based on the data obtained from the financial system and loyalty management system, including frequency of use of the customer account, the past and present spending activity associated with the customer account, a creditworthiness of the customer, and an age of the credit account.

18. The non-transitory, computer-readable medium of claim 17, wherein dynamically adjusting the threshold range to obtain the updated threshold range based on the data obtained from the financial system and loyalty management system, comprises:
determining that the current point balance is less than the point value cost of the reward;
determining that the difference between the current point balance and the point value cost of the reward is within the updated threshold range; and
in response to determining that the difference is within the updated threshold range, determining to offer the customer a loan of points to be added to the current point balance of the loyalty account.

19. A computerized method performed by one or more processors of an offer management system, the method comprising:
identifying, by the one or more processors of the offer management system, a triggering event initiating a point balance loan offer analysis for a first customer account associated with a customer from a plurality of customer accounts, wherein each customer account in the plurality of customer accounts is associated with a particular customer, wherein each customer account stores an account balance and a point deficit balance;
applying the point balance loan offer analysis to the first customer account, comprising determining, by the one or more processors of the offer management system and based on data obtained from the first customer account and data obtained from a loyalty account corresponding to the first customer account, to offer the customer a loan of points to be added to the current point balance of the loyalty account;
in response determining that the point balance loan offer is to be provided to the customer associated with the first customer account, transmit, by the one or more processors of the offer management system and to a client device associated with the first customer, an offer for a point balance loan equal to an amount of at least a difference between the current point balance of the loyalty account and the point value cost of the at least one reward; and
in response to receiving, from the client device, an acceptance of the points balance loan offer, transmitting, to the loyalty management system, an instruction to increment the current point balance of the loyalty account associated with the first customer account by the amount of the offer and transmitting, to the financial system, an instruction to increment the point deficit balance of the first customer account by the amount of the offer;
performing, by the one or more processors of the offer management system, a redemption of the at least one identified reward in the loyalty account using the point value of the at least one identified reward from the incremented point balance of the loyalty account, wherein the point balance of the loyalty account is decremented by the point value of the at least one identified reward; and
in response to detecting an end of an account period:
automatically and without user input, configuring, by the one or more processors of the offer management system, a point balance processor of the loyalty management system to increment the current point balance of the loyalty account corresponding to the customer account by an amount of loyalty points earned during the account period and (2) in response to determining that the point deficit balance of the first customer account is not zero, decrement the current point balance of the loyalty account corresponding to the customer account to reduce the value of the point deficit balance of the first customer account;
in response to determining that the point deficit balance obtained from the financial system is greater than the incremented current point balance of the loyalty account, automatically and without user input, configuring, by the one or more processors of the offer management system, a point balance processor of the loyalty management system decrement the current point balance of the loyalty account to reduce the value of the point deficit balance of the first customer account; and
automatically and without user input, configuring, by the one or more processors of the offer management system, a statement processor to generate for the customer account, a statement specifying (1) a current account balance of the customer account received from the financial system and (2) a current point balance of the loyalty account corresponding to the customer account received from the loyalty management system, wherein the statement processor is configured to interrupt the statement generation to insert the value of the point deficit balance into the generated statement when the point deficit balance of the customer account is non-zero.

* * * * *

UNITED STATES PATENT AND TRADEMARK OFFICE
CERTIFICATE OF CORRECTION

| | |
|---|---|
| PATENT NO. | : 11,605,106 B2 |
| APPLICATION NO. | : 16/156858 |
| DATED | : March 14, 2023 |
| INVENTOR(S) | : Adrian Bloy et al. |

Page 1 of 1

It is certified that error appears in the above-identified patent and that said Letters Patent is hereby corrected as shown below:

In the Claims

Claim 19: In Column 28, Line 14, after "response" insert -- to --.

Signed and Sealed this
Fifth Day of March, 2024

Katherine Kelly Vidal
*Director of the United States Patent and Trademark Office*